(12) United States Patent
Al-hemyari et al.

(10) Patent No.: US 6,636,668 B1
(45) Date of Patent: Oct. 21, 2003

(54) LOCALIZED THERMAL TUNING OF RING RESONATORS

(75) Inventors: Kadhair Al-hemyari, Northville, MI (US); Christopher T. Youtsey, Farmington Hills, MI (US)

(73) Assignee: LNL Technologies, Inc., Cambridge, MA (US)

( * ) Notice: Subject to any disclaimer, the term of this patent is extended or adjusted under 35 U.S.C. 154(b) by 293 days.

(21) Appl. No.: 09/718,662

(22) Filed: Nov. 22, 2000

Related U.S. Application Data (60) Provisional application No. 60/167,139, filed on Nov. 23, 1999.

(51) Int. Cl.[7] .................................................. G02B 6/26
(52) U.S. Cl. ............................. 385/40; 385/32; 385/16
(58) Field of Search ....................... 385/15–24, 31–32, 385/39–40

(56) References Cited

U.S. PATENT DOCUMENTS 6,411,752 B1 * 6/2002 Little et al. .................... 385/17

FOREIGN PATENT DOCUMENTS

WO    WO 01/27692 A1 * 4/2001 ........... G02F/1/313

* cited by examiner

Primary Examiner—Akm Enayet Ullah
Assistant Examiner—Jerry T Rahll
(74) Attorney, Agent, or Firm—Edwards & Angell, LLP

(57) ABSTRACT

A thermally tunable resonator includes a resonator body having a resonance wavelength which changes as a function of temperature, a trench formed inside the resonator body, and a disk formed inside the trench and which is made from semiconductor layers, the layers being doped to form a forward biased junction. A first electrode, which does not cover the resonator body, is located atop the disk and in electrical contact with the forward biased junction, and a second electrode is located beneath and in electrical contact with the forward biased junction. When current is applied through the electrodes, heat is generated, changing the resonator body's resonance wavelength. Another thermally tunable resonator has a resonator body and heater in which two contact pads are electrically connected to a resistance above the resonator body. When current is applied to the resistance, heat is generated, changing the resonator body's resonance wavelength. A temperature sensor can be used to sense the resonator body's temperature.

17 Claims, 7 Drawing Sheets

LOCALIZED THERMAL TUNING OF RING RESONATORS

CROSS-REFERENCE TO RELATED APPLICATION

This application claims priority to Provisional Patent Application No. 60/167,139, filed on Nov. 23, 1999.

FIELD OF THE INVENTION

The present invention is directed to an optical ring resonator and the like having a wavelength tuning range which can be varied with accuracy.

BACKGROUND OF THE INVENTION

Optical ring resonators are of great interest in the telecommunication industry because of their ability to provide cross-connect architectures and because they can be made very compact in size. Other technologies that have been used to provide cross-connect architectures include thin-film interference filters, fiber gratings and arrayed waveguide gratings.

Cross-connect waveguide architecture is described in International Patent Appln. No. WO 00/50938, entitled "Vertically Coupled Optical Resonator Devices Over a Cross-Grid Waveguide Architecture".

Figure 1:
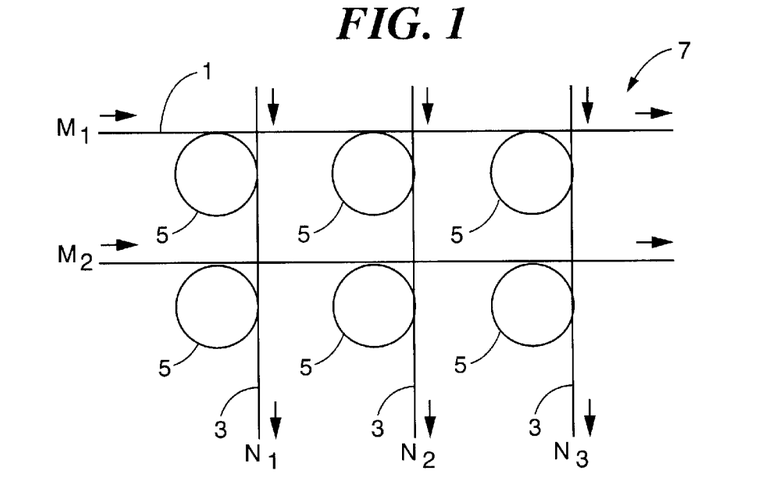
FIG. 1 is a schematic view of an optical data network cross-connect.

One example of a cross-connect architecture using optical ring resonators is shown in FIG. 1, and is discussed hereafter.

An optical semiconductor resonator 7 has plurality of microcavity resonators 5 and input and output waveguides 1, 3 formed from semiconductor materials. The input 1 and output 3 waveguides are arranged so that a portion of each of the two waveguides is disposed adjacent to the microcavity resonator 5. Light propagating in the input waveguide 1 with a wavelength on resonance with the resonance wavelength of the microcavity resonator 5 is coupled to the microcavity resonator 5, and from the microcavity resonator 5 the light is coupled to the output waveguide, by way of example, $n_1$, for transmission therefrom. Light propagating in the input waveguide 1 with a wavelength that is off resonance with the microcavity resonator 5 is not coupled to the microcavity resonator 5, but continues to propagate in the input waveguide 1 for output therefrom. Consequently, a resonator can serve as a wavelength-specific routing device which guides particular wavelengths of light from an input path to one of several output paths.

It will be appreciated that the terms "input" and "output" are used for convenience, and that light could be transmitted in the opposite manner, that is, from the "output" waveguide to the "input" waveguide.

The resonance wavelength for a ring resonator is a direct function of the ring resonator's structure, and can be given as:

$$\lambda_i = 2\pi R n / i \quad (1)$$

where $\lambda_i$ is the resonance wavelength, R is the resonator radius (for a circular resonator), n is the resonator's effective index of refraction, and i is any positive integer.

If the resonator is not circular, the resonant wavelength is given by the equation (2):

$$\lambda = \frac{Ln}{m} \quad (2)$$

In equation 2 L is the resonator's length, n is the effective index of refraction of the optical signal, and m is an integer of value 1 or greater.

Resonator operation can be enhanced if the resonator's operating wavelength can be varied, as that allows modification of the resonator's switching behavior. For example, a user can select which wavelengths of light transmitted by a first waveguide are coupled to the resonator and to a second waveguide by changing the resonator's resonance wavelength to match the wavelength of light sought to be routed.

There are several ways to alter a resonator's index of refraction and so control the resonator's operating wavelength. In accordance with equations (1) and (2), a resonator's resonance wavelength is related to the resonator material and its index of refraction, so changing the resonator index of refraction leads to a corresponding change in the resonator resonance wavelength. Alternatively, the resonator's size (i.e., radius) will determine the resonance wavelength.

Certain materials used in ring resonators have indices of refraction which vary with temperature. A ring resonator made from such a material could be thermally tuned. Changing the ring resonator's temperature will alter the resonator's index of refraction and size, as discussed in greater detail below, and thus produce a corresponding change in the resonance wavelength.

Another way to control a ring resonator's resonance wavelength is to inject current into the resonator ring. Some of the semiconductor materials that can be used in ring resonators exhibit electro-optic behavior. A material having electro-optic properties experiences a change in its index of refraction when an electric field is applied thereto. A ring resonator constructed from an electro-optic semiconductor material can therefore be tuned through the application of a suitable electric field.

As already noted, ring resonators are frequently employed as part of the cross-connect architecture of optical networks. Ring resonators are well-suited for use as telecommunications systems switching devices in Wave Division Multiplexing ("WDM") systems, various types of which systems will be discussed later on. These systems efficiently transmit data by simultaneously sending several different wavelengths of light over a single optical fiber or waveguide and then, at the appropriate point, separating (de-multiplexing) the combined signals into individual optical fibers or waveguides and routing those signals to their desired endpoints or destinations.

FIG. 1 depicts a typical network architecture based on ring resonators, namely, an M×N optical data network cross-connect 7. In cross-connect 7 each resonator 5 can take the signal coming from a horizontal input waveguide 1, and couple it into a vertical output waveguide 3, provided the wavelength of the optical signal in the input waveguide 1 is on-resonance with the resonance wavelength of the resonator 5. On the other hand, if the wavelength of the optical signal in the input waveguide 1 and the resonance wavelength of the resonator 5 are different, the optical signal remains undisturbed, i.e., does not couple to the resonator 5 in the input waveguide 1 and thus can travel toward and encounter a second resonator 5 downstream along the optical path of that waveguide 1.

Each of the M input waveguides 1 can be a long-distance transmission medium (i.e., fiber-optic cable or waveguide)

which simultaneously carries a number of different wavelength signals between widely-separated points. The N output waveguides 3 may connect to optic fibers which carry a particular wavelength(s) of light between the long-distance transmission medium and a single device or user. Incidentally, it should be understood that while the foregoing discussion refers to optical fibers, the, input and/or output lines 1, 3, also could be any other suitable optical transmission devices, including by way of non-limiting example, waveguides.

Since the different wavelengths of light which are carried by each of the M input waveguides 1 are intended for different destinations, it is necessary to separate and suitably route each of those different wavelengths of light. As noted above, ring resonators 3 perform this routing function quickly and efficiently—since each ring resonator 5 can couple a particular, wavelength of light traveling in an input waveguide 1 to an output wave guide 3, ring resonators 5 can be used to "pick off" the different wavelengths of light from a multi-wavelength optical signal, e.g., a WDM signal.

One common type of cross-connect is a multiplexer (MUX)/demultiplexer (deMUX). A MUX/deMUX is a cross-connect that links a multi-wavelength optical waveguide carrying N wavelengths of light to a total of N waveguides. Thus, in a MUX/deMUX, a single multi-wavelength waveguide will have a total of N corresponding ring resonators.

If the ring resonators used in a cross-connect can only separate out a, single wavelength of light, it will be necessary to provide the cross-connect with M×N resonators. However, if the ring resonators can be tuned sufficiently, each of the ring resonators could separate out multiple wavelengths of light, and so some resonators could be omitted and the cross-connect structure could be simplified.

To be useful to the telecommunication market, resonators should meet two basic requirements, namely, they should be small in size and they should have a high tunability range.

Small size is desirable for two reasons. First, small resonators require less wafer real estate, which reduces costs. Second, small resonators have large free spectral range (FSR) characteristics. A resonator's FSR is given as:

$$FSR = \lambda \frac{\lambda}{(2\pi R n)} \quad (3)$$

Here, $\lambda$ is the wavelength of the optical signal, R is the radius of the resonator and n is the effective refractive index material through which the optical signal propagates.

Figure 3A:
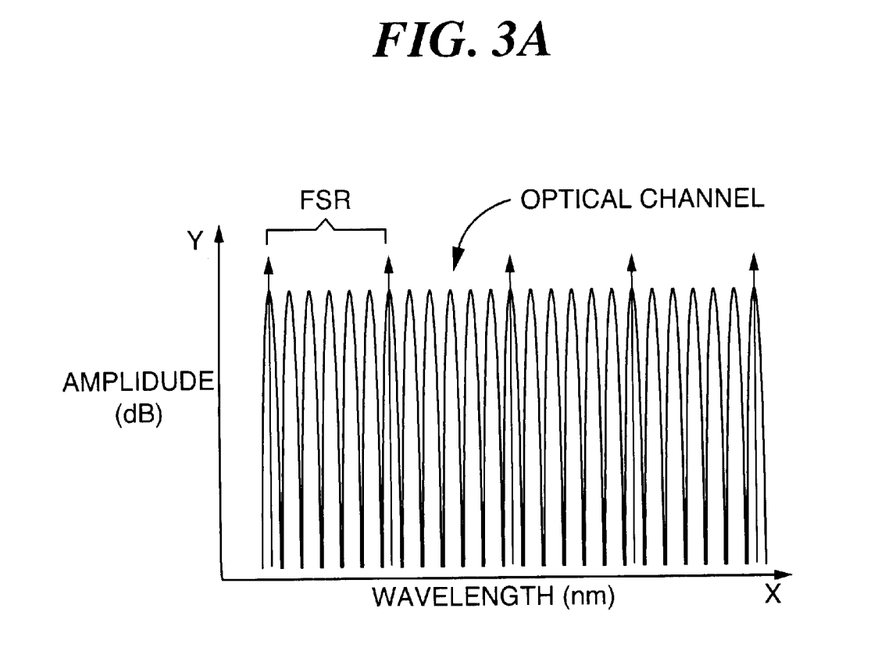
FIGS. 3A and 3B illustrate the relationship between a ring resonator's free spectral range and the number of optical channels which can be multiplexed by the resonator into a single fiber.
Figure 3B:
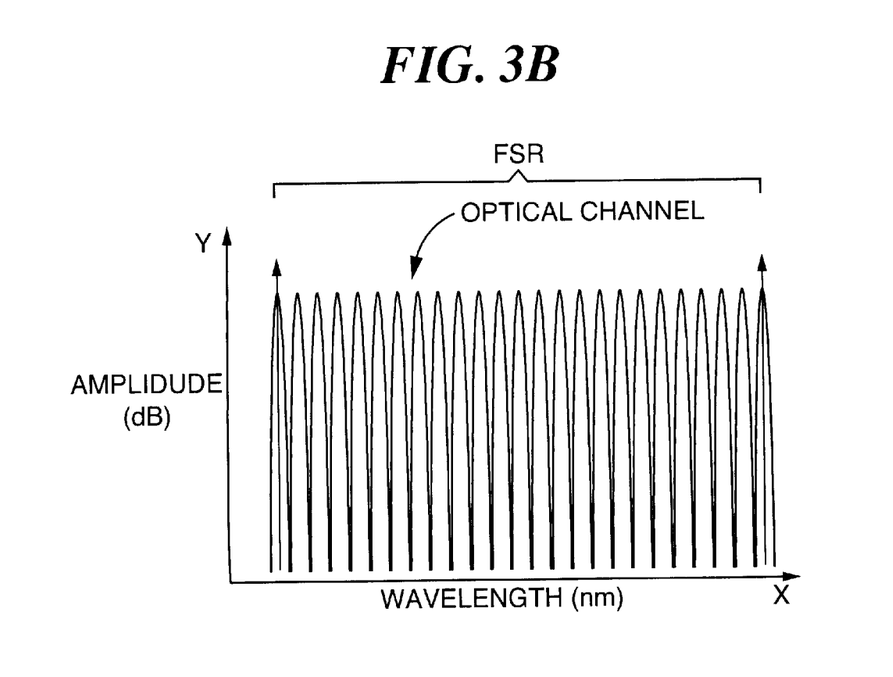

A large FSR may be preferred because it allows for a higher number of optical channels to be multiplexed in a single fiber, which better uses the fiber's optical bandwidth. FIG. 3A depicts the spectral response and optical channel accommodation for a 10 $\mu$m FSR resonator having architecture that allows for approximately six GHz channels in the 1.55 $\mu$m telecommunication window. In contrast, a 40 $\mu$m FSR resonator architecture could accommodate approximately twenty-five different optical channels, as illustrated in FIG. 3B. A compact resonator (or equivalently a resonator with a small radius) can be constructed in part by using strongly-confined waveguides (the term "strongly-confined" refers to a waveguide having a substantial difference in the index of refraction between core and cladding regions). Strongly-confined waveguides are useful because they are able to guide light around sharp bends.

There are a number of reasons why high resonator tunability is desirable.

In today's technology, resonators with the dimensional precision required to insure that the resonators perform as required cannot easily be manufactured. Resonator size is important because as shown above in connection with Equations 1 and 2, a resonator's radius directly affects both the resonator's resonance wavelength and the resonator's FSR. The resonator's resonance wavelength is particularly important because it must comply with the ITU grid, which is a telecommunication standard that divides telecommunications windows into optical channels that are typically separated by fractions of a nanometer. If the resonator is to be used in a telecommunications system, the resonator's wavelength must strictly conform to the ITU grid standard.

Using existing microfabrication technology, it is difficult to control the resonator radius with the accuracy necessary to assure that its resonance wavelength is precisely tuned to a wavelength lying on the ITU grid. This problem arises because the resonance wavelengths of an optical resonator are inversely related to the resonator's size. This means that the resonance wavelength of a small resonator will be much more sensitive to variations in resonator radius than that of a large resonator.

By way of example, a deviation of just 10 nm in the radius of a nominally 10 $\mu$m radius resonator (and this 0.1% deviation-presses the limits of what can be achieved using optical lithography) results in a resonator wavelength resonance deviation of 1.55 nm from the nominal wavelength for which the resonator was designed. A deviation of that magnitude is undesirable and in fact may be unacceptable in today's telecommunication networks, since those networks have channel spacings well below 1 nm. Some form of wavelength tuning is therefore essential to reposition the resonance wavelength onto the ITU grid.

Such manufacturing deviations might, however, be tolerable if the resonator could be tuned sufficiently to change the resonator's wavelength resonance to compensate for those variations. Known tuning techniques, which will be discussed in detail below, do not provide a sufficient tuning range to compensate for such manufacturing variations.

Figure 2A:
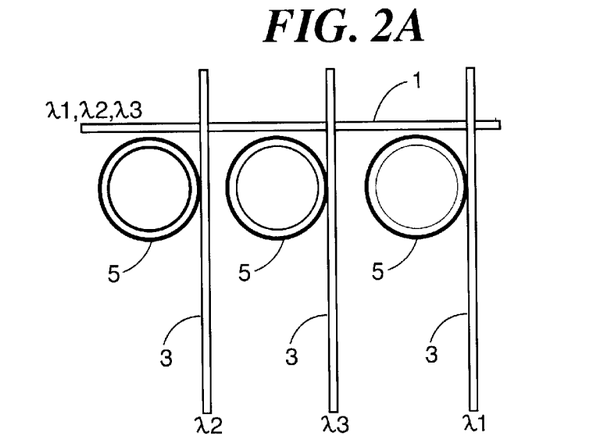
FIGS. 2A and 2B are schematic views showing two different configurations of a portion of an optical data network.
Figure 2B:
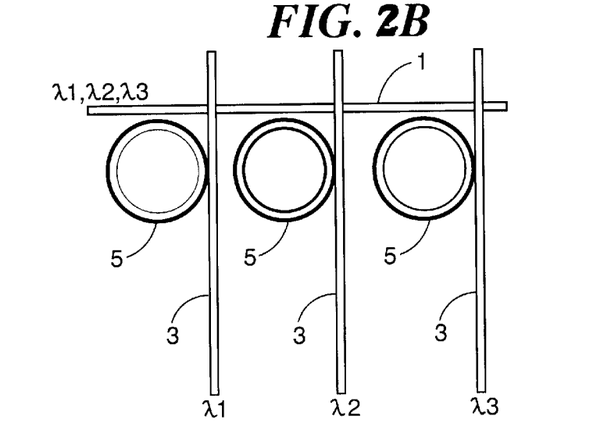

Increased resonator tunability is also desirable because it enables a network administrator to reconfigure dynamically the network during operation, without interrupting service, according to usage considerations and the demands of their clients. FIGS. 2A and 2B show an example of a network reconfigured from the arrangement shown in FIG. 2A to that shown in FIG. 2B. By selectively tuning each resonator 5 to a desired wavelength, various wavelengths present in the input waveguide 1 may be routed to the various output waveguides 3. That selective reconfiguration may change the paths of the signals with wavelengths $\lambda_1$, $\lambda_2$ and $\lambda_3$.

There are several techniques by which a resonator may be tuned. The optical resonance wavelength is a function of both the resonator geometry and the waveguide refractive index, as set forth previously in Equation. 1. Therefore, to change the resonance wavelength, either the index of refraction or the physical optical path length (for example, given in Equation 1 as n and R, respectively) must be altered.

The index of refraction of the waveguide material can be altered by changing the waveguide's temperature (thermal tuning), injecting current (current tuning) into the waveguide, or applying voltage to the waveguide (electro-optic tuning).

For thermal tuning, the resonance wavelength shift can be expressed as:

$$\Delta\lambda = \lambda \frac{\Delta n \Delta R}{nR} \quad (4)$$

Here $\lambda$ is the wavelength of the optical signal, $\Delta n$ is the change in the resonator material's index of refraction, $\Delta R$ is the change in the resonator's radius, n is the effective index of refraction of the resonator material, and R is the resonator's radius.

Thermal tuning is discussed in Rafizadeh, D., et al., "Temperature Tuning of Microcavity Ring and Disk Resonators at 1.5-µm", IEEE publication number 0-7803-3895-2/19 (1997). Rafizadeh discloses that the thermal tuning coefficient of a GaAs-based 10.5 µm-diameter disk resonator has been experimentally observed to be 1.3 nm/10° C.

In the case of either current injection or electro-optical tuning, the resulting change in resonance wavelength is:

$$\Delta\lambda = \lambda\left(\frac{\Delta n}{n}\right) \quad (5)$$

Again, $\lambda$ is the wavelength of the optical signal, $\Delta n$ is the change in the resonator material's index of refraction, and n is the effective index of refraction of the resonator material.

A common semiconductor waveguide construction for implementing either current injection or electro-optic tuning involves doping the upper cladding with p-type dopant, the waveguide core with low or intrinsic dopant, and the lower cladding and substrate with n-type dopant. If electric contact is made to the upper (p-type) and lower (n-type) waveguide layers, the resulting p-i-n junction may then be operated in forward- or reverse-bias mode. Under forward bias, a change in the index of refraction of the waveguide core may be induced through current injection. Under reverse bias, a high electrical field can be formed across the intrinsic waveguide core and a refractive index change can result through the electro-optic effect. Both of these effects provide only a relatively small tuning effect.

Although tuning by changing the index of refraction using either current injection or the electro-optic effect can provide very high switching speeds (in the microsecond and nanosecond regimes, respectively), these techniques can only tune a resonator over a very limited range of wavelengths, on the order of several nanometers. This is not sufficient, however, since tuning over a spectral range of at least 10–20 nm is desirable for many telecommunication applications.

Thermal tuning offers the possibility of a much greater tuning range than current injection and the electro-optic effect, although at somewhat slower speeds (expected to be in the sub-millisecond or even millisecond range).

While general thermal tuning of telecommunications devices, such as laser diodes or arrayed waveguide gratings, is known, such thermal tuning is global, not local. That is, since many such telecommunications devices are highly sensitive to temperature changes, global temperature control of the entire device may be provided to improve wavelength stability, as well as to effect tuning. For such components, global temperature control is achieved by mounting the substrate to a temperature controlling device, such as a thermoelectric cooler (TEC).

A specific form of temperature control has been used in certain thermo-optic switches which incorporate Mach-Zehnder interferometers (MZI). As described in Lai, Q., et al. "Low-Power Compact 2×2 Thermooptic Silica-on-Silicon Waveguide Switch With Fast Response", IEEE publication number 1041-1135/98 (1998), an electric heater is fabricated over one optical waveguide of the MZI. Switching is achieved by heating the arm of the MZI to cause a temperature change of 40 ° C. and alter the arm's index of refraction, thereby inducing a $\pi$ phase shift into the waveguide arm. These MZI devices are 5 mm long and so are far too large for practical use in an optical system.

Consequently, while ring resonators can be tuned to vary the wavelength of light coupled between input and output waveguides, there is additional strong demand for resonators which can be tuned across a wider range of wavelengths.

More particularly, there is a need for a ring resonator that can be tuned such that the resonator's operating wavelength varies by at least approximately an order of magnitude more than the 1–2 nm tuning range currently achievable.

SUMMARY OF THE INVENTION

The present invention is directed in part toward localized thermal tuning of optical resonators. This is in marked contrast to the conventional thermal tuning of telecommunications devices, already discussed, which use global thermal tuning.

Optical resonators with compact dimension (on the order of several tens-of microns or less) offer the promise of high integration densities. As discussed previously, some form of tuning is critically important for these devices, due to their sensitivity to fabrication tolerances as well as to enable network reconfiguration. Thermal tuning is a very important physical effect because it can produce relatively large changes in resonance wavelength compared to other tuning methods. This invention achieves thermal tuning of optical resonators by delivering localized thermal energy to the resonator cavity. This allows single resonators to be tuned individually, thereby enabling high device integration densities to be realized.

An important feature of this invention is the use of a compact electric heater which can provide efficient, localized heating of the optical resonator. This heater could take the form of a forward-biased or p-i-n junction, or a surface resistance heater.

Among the benefits of this invention is the avoidance of absorption loss due to free carriers or change in the strength of the optical field confinement within the waveguide guiding region. This is possible because heating is accomplished in a manner which does not interfere with resonator operation.

Another benefit to this invention is that wavelength tuning and switching can be effected over a wide wavelength spectrum, especially if GaAs- or InP-based waveguides are used.

Still another advantage to this invention is that single mode GaAs-base P-I-N optical waveguide materials can be designed with thicker guiding region compared to InP-based waveguides. This enhances coupling efficiency.

By virtue of their small size, devices constructed in accordance with this invention are highly integratable in a large matrix on a single small substrate chip.

The present invention provides a thermally tunable resonator using a self-feeding resonator body with a resonance wavelength, a trench formed inside the resonator body, and a disk formed inside the trench, the disk having semiconductor layers which are doped to form a forward biased junction. A first electrode is positioned atop the disk and in electrical contact with the forward biased junction, this electrode not covering the resonator body, and a second electrode is formed beneath and in electrical contact with the forward biased junction. When current is applied through the electrodes to the disk, heat is generated, and this changes the resonance wavelength of the resonator body.

Another aspect of this invention relates to a thermally tunable resonator having a self-feeding resonator body with a resonance wavelength and a heater. The heater has first and second contact pads that connect to a resistance disposed above the resonator body. When current is applied through the contact pads to the resistance, heat is generated, changing the resonator body's resonance wavelength.

This invention also involves a thermally tunable resonator which includes a self-feeding resonator body with a resonance wavelength, a heater having first and second contact pads, and a resistance connected to the contact pads and disposed above the resonator body. A temperature sensor senses the temperature of the resonator body, and when current is applied through the contact pads to the resistance, heat is generated, changing the resonance wavelength of the resonator body.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views:

FIGS. 9A–F are schematic views of different types of resonators.

DETAILED DESCRIPTION OF THE PRESENTLY PREFERRED EMBODIMENTS

As used herein, the terms "light signal" and "optical signal" are used interchangeably, and may include signals such as WDM, DWDM, UDWDM signals, and the like. The terms "light", "light signal" and optical signal" are intended to be broadly construed and to refer to visible, infrared, ultraviolet light, and the like.

Figure 4A:
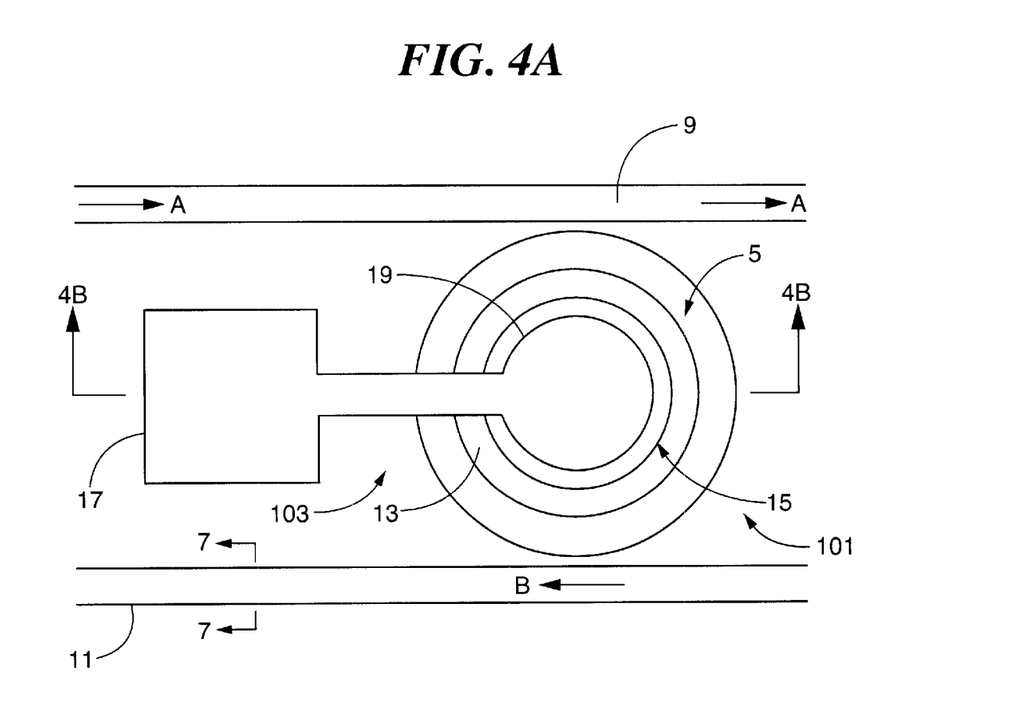
FIG. 4A is a top plan view of a coupler having a tunable ring resonator constructed in accordance with an embodiment of the present invention.
Figure 4B:
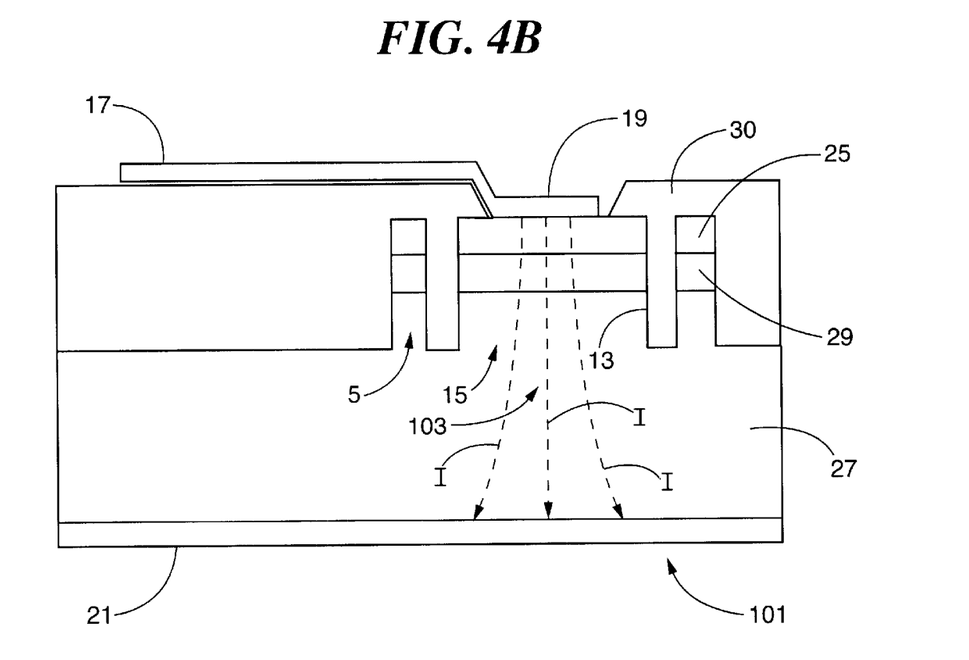
FIG. 4B is a cross-sectional view as taken along line 4B—4B of the coupler depicted in FIG. 4A.
Figure 5:
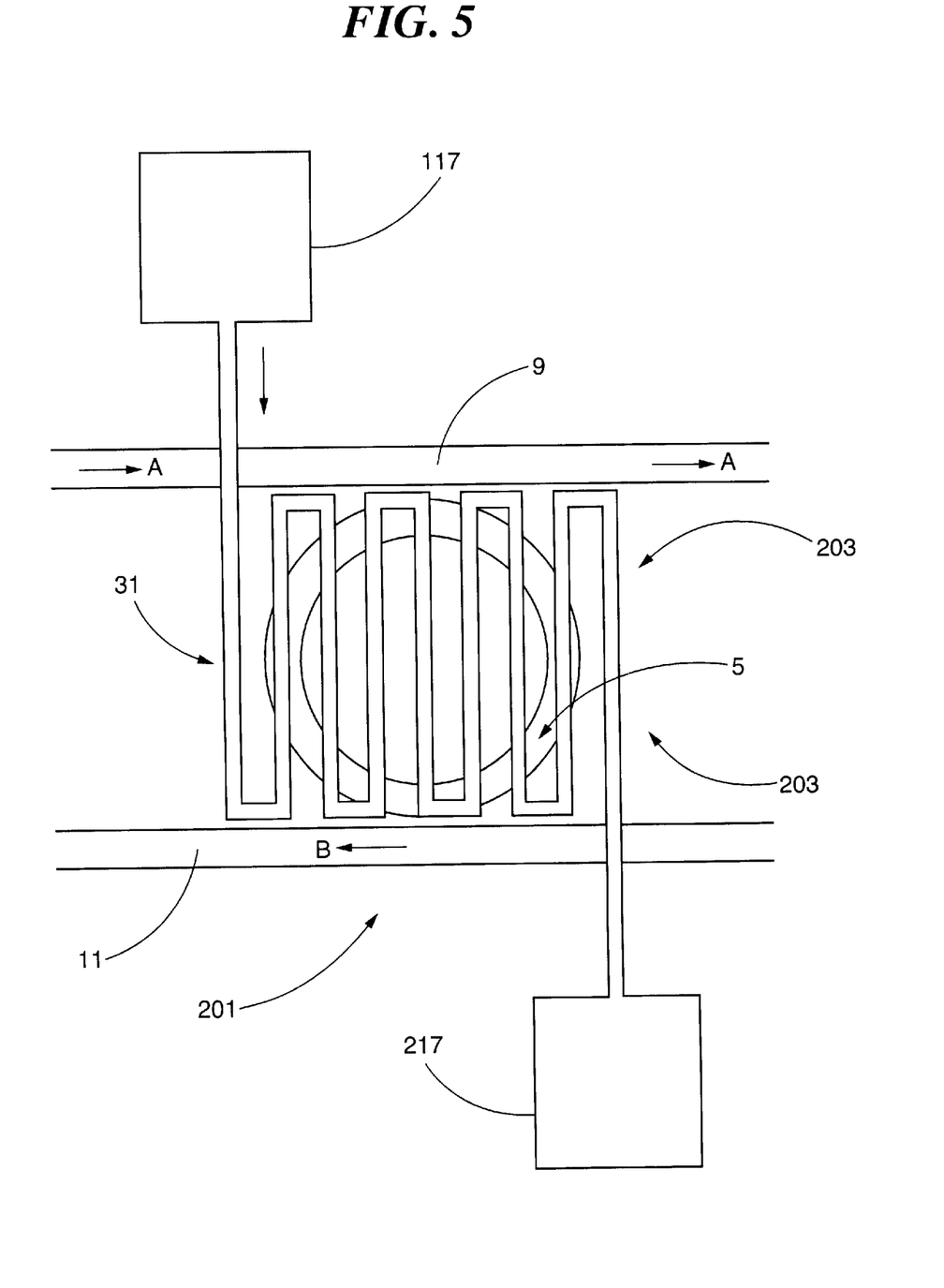
FIG. 5 depicts a coupler having an alternate tunable ring resonator constructed in accordance with an embodiment of the present invention.
Figure 6:
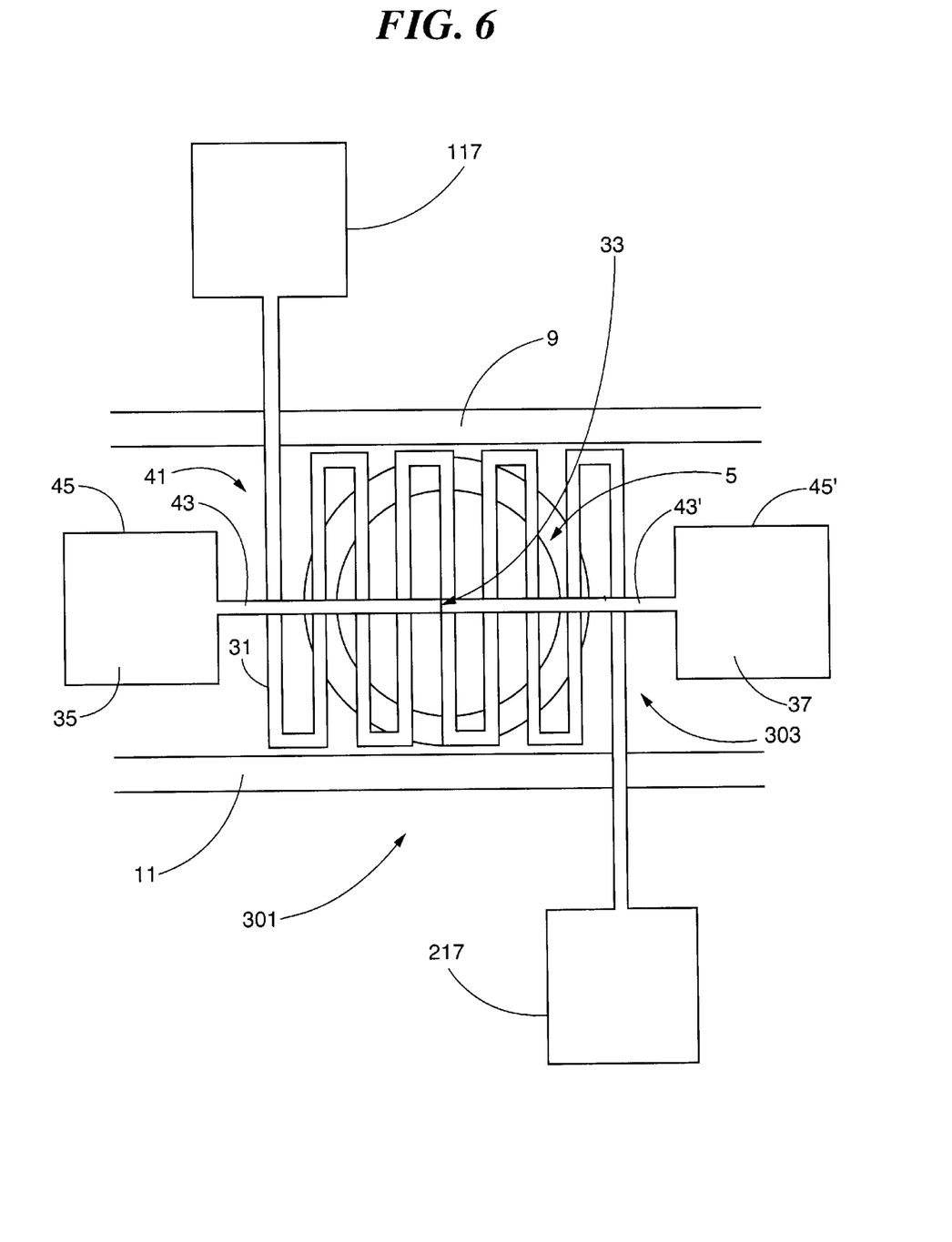
FIG. 6 depicts a coupler having still another alternate tunable ring resonator constructed in accordance with an embodiment of the present invention.

An important feature of this invention is the use of a very compact electric heater which can provide efficient, localized heating of an optical resonator. This heater could be realized in a variety of ways, such as a forward-biased or p-i-n junction, which is shown in FIGS. 4A and 4B, and a surface resistance heater, which is shown in FIGS. 5 and 6. Each of these heater constructions will be discussed in turn.

FIGS. 4A, 5 and 6 depict various aspects of a coupler 101, 201, 301 incorporating a tunable ring resonator 5 constructed in accordance with one embodiment of this invention. Each coupler 101, 201, 301 includes an input waveguide 9 from which light may be coupled into the resonator 5, an output waveguide 11 to which light may couple out from the resonator 5, and, of course, the resonator 5 itself. The resonator 5 differs from conventional ring resonators in that it includes a localized heater structure.

As illustrated in FIG. 4A, light traveling along input waveguide 9 in the direction of arrows A is either output from the coupler 101 through input waveguide 9 or, if the light has the proper wavelength for coupling to the resonator 5, coupled and output through output waveguide 11 in the direction of arrow B.

The shapes and orientations of the input and output waveguides 9, 11 as shown in FIG. 4A are only exemplary; either or both of these waveguides 9, 11 can be straight or curved. Nor do those waveguides 9, 11 have to be parallel to each other.

Similarly, while FIGS. 4A and 4B depict a cylindrical and annular components, the present invention is not to be limited to such shapes. As described below and with reference to FIGS. 9A–F, different shaped resonators 5 could be employed. Correspondingly-shaped non-circular components also could be used.

With regard to coupling between the input and output waveguides 9, 11, the tunable resonator 5 used in coupler 101 operates in a manner comparable to known resonators. When the wavelength of the optical signal propagating though the input waveguide 9 is the same as the ring resonator's resonance wavelength, the signal couples from the input waveguide 9 to resonator 5 and from the resonator 5 into the output waveguide 11. Otherwise, the optical signal continues propagating through the input waveguide 9.

The amount of signal; coupled by the coupler 101 into and out of the resonator body 5 is controlled by three variables: coupling between the input waveguide 9 and the resonator 5, coupling between the resonator 5 and the output waveguide 11; and by the losses in the resonator.

With continued reference to FIGS. 4A and 4B, a diode junction heater 103 is provided to tune resonator 5. Diode junction heater 103 has a cylindrical disk 15 formed within resonator 5. The cylindrical disk 15 is separated from the resonator 5 by cylindrical trench 13. The cylindrical disk 15, cylindrical trench 13 and resonator 5 are all arranged concentrically about a common center point (not shown). A diode 103 may be formed as an integral part of the structure of the coupler 101.

As previously pointed out, the present invention is not intended to be limited to circular and annular components—the terms "cylindrical disk", "cylindrical trench" and "ring" are used by way of example only, and not limitation. These terms, and the terms "disk" and "ring" are to be construed broadly and are meant to cover any shapes which can serve in an optical resonator, which other shapes are equivalents thereto.

With particular reference to FIG. 4B, it will be seen that diode junction heater 103 is a layered structure arranged as follows. A core layer 29 is sandwiched between an upper cladding layer 25 and a lower cladding layer 27, which also serves as a substrate. The core layer 29 is formed of a material having a higher refractive index than the surrounding cladding layers 25, 27. Alternatively, a separate substrate could be provided, and such a substrate could be made, for example, from silicon or quartz.

The cylindrical trench 13 formed in the diode junction heater 103 is sufficiently deep to extend completely through the upper cladding layer 25 and the core layer 29, and part of the way through the lower cladding layer 27.

The cylindrical trench 13 can be formed using any suitable manufacturing technique, preferably by etching a ring-shaped trench into a disk-shaped resonator (not-shown). This results in formation of both the cylindrical disk 15 and the ring resonator 5.

With continued reference to.FIG. 4B, in order to provide a coupler 101 having a sufficiently level top surface, the cylindrical disk 15, cylindrical trench 13 and resonator 5 are coated with a leveling material 30. Preferably, the leveling material 30 is applied to fill completely the cylindrical trench 13 and to cover all of the resonator 5. As explained in greater detail below, the center of the cylindrical disk 15 preferably is not covered by the leveling material 30, this having been done in order to facilitate electrical contact with the heater 103.

Leveling material 30 has optical properties which do not prevent confinement of light within the waveguides 9, 11 or resonator 5. Leveling material 30 is preferably made from BCB/polyimide or $SiO_2/Si_3N_4$.

Continuing with reference to FIGS. 4A and 4B, a top electrode 19 is applied atop the cylindrical disk 15 where the center of the cylindrical disk 15 is not covered by leveling material 30. Top electrode 19 is preferably arranged so as not to overlap the optical field defined by the resonator 5. This way, there is no added loss, which is polarization dependent due to absorption by the top electrode 19.

Top electrode 19 is electrically connected to a surface-mounted contact pad 17, which rests atop leveling material 30. The contact pad 17 is positioned some distance from the resonator 5. A bottom electrode 21 provides electrical contact with the underside of the lower cladding layer 27 and completes a circuit with top electrode 19 through which current, generally designated as I, may flow.

Preferably, the upper cladding layer 25, the core layer 29, and the lower cladding layer 27 are doped to form a forward-biased or P-I-N semiconductor layer structure. This can be accomplished using p-type, n-type or intrinsic doping. It is presently thought to be preferred to have low or intrinsic doping in the waveguide core layer 29 to minimize the free optical carrier absorption losses. It will be understood that each of these cladding and core layers 25, 27, 29 should be made from semiconductor material such as GaAs, InP and Si.

To energize the diode junction heater 103, current is applied through top electrode 19 and flows through the cylindrical disk 15 to the bottom electrode 21. The current passing through the forwardly-biased p-i-n structure will generate heat in the diode. That heat will be dissipated in the diode and conducted laterally across trench 13 to the ring resonator 5. This heat flow will be affected in part by the size of the cylindrical trench 13 separating the cylindrical disk 15 and the resonator 5, as well as by the thermal conductivity of the leveling material 30 in the cylindrical trench 13. It is presently thought to be preferable for the cylindrical trench 13 to be no more than several microns in radius so as to maximize thermal conduction therethrough.

This system for the thermal tuning of optical resonators can be used in devices having waveguide systems made from semiconductors (GaAs, InP, Si), since doped junctions (p-type, intrinsic or n-type) can only be implemented in semiconductor materials. By way of example only, and not limitation, core layer 29 is preferably made from InP- or GaAs-based waveguide materials. Upper cladding layer 25 is preferably made from InP- or GaAs-based waveguide materials. Lower cladding layer 27 is preferably made from InP- or GaAs-based waveguide materials. While a forward-biased p-i-n device such as diode junction heater 103 can be used for heat generating, such a device may not always be an efficient thermal source. The electrical power that is applied to the diode junction heater 103 will in part be wasted generating photons (especially for direct bandgap semiconductors such as GaAs and InP) in addition to heating resistive regions of the diode junction heater 103. In particular, depending on the quality of electrical contact, significant heat is likely to be generated by p-type ohmic contact. Consequently, the following further embodiments of this invention have been developed.

With reference to FIG. 5, an alternative construction for effecting localized heating of an optical resonator 5 is depicted. The coupler 201 shown in FIG. 5 includes, in addition to input waveguide 9, output waveguide 11, and resonator 5, a thin-film surface resistance heater 203. In this coupler 201, the thin film surface resistance heater 203 is formed by placing a resistive element 31 between two terminating electrical contact pads 117, 217. The heater 203 is energized by passing electrical current between the two contact pads 117, 217, so that the current flows through the resistive element 31.

This preferred design of the heater 203 employs a serpentine resistive element 31, since this maximizes resistance between the two contact pads 117, 217. This increases the efficiency of the heater 203 by ensuring that most of the voltage drop (and, consequently, the power dissipation) occurs across the serpentine resistive element 31 and not in other parasitic resistances in the circuit, which otherwise might be found in contacts 117, 217 or in bond wires (not shown). The resistance of the heater 203 can be increased by maximizing the length of the conductor serpentine resistive element 31 between the contact pads 117, 217 (hence the serpentine shape) and by minimizing the trace width and film thickness. The material used for the serpentine resistive element 31 should be conductive and also have high resistivity. By way of example-only, and not limitation, such materials could include but are not limited to NiCr, Cr or C. It should be noted that these materials differ from the contact pad material, which is preferably made of Au because of its high conductivity, wire bondability, and high oxidation resistance.

As depicted in FIG. 5, the serpentine resistive element 31 overlaps the resonator 5. The term "overlaps" is used in its broadest sense, and does not require every part of resonator 5 be covered by a portion of the serpentine resistive element 31. Although this drawing shows a serpentine resistive element 31, which can be said to cover the resonator 5 with substantial uniformity, substantial portions of resonator 5 could be left exposed; nor need the resonator 5 be covered evenly or symmetrically.

It also will be appreciated that other resistance patterns could be used in place of the depicted serpentine arrangement. By way of example only and not limitation, spirals or random arrangements (not shown) could be provided.

A further advantage of the surface resistance heater 203 is that it may be utilized with any type of waveguide structure and material. This includes, but is not limited to, the use of optical waveguides fabricated from semiconductors, silica glass, polymers and lithium niobate.

In order to accurately control the shift in resonance wavelength when using heater 203 as shown in FIG. 5, it will be desirable to have precise control over the localized resonator temperature. Based on experimental data taken from GaAs microcavity resonators, to control the resonance: wavelength with a precision of 0.1 nm, is necessary to control the resonator temperature to within approximately 1° C. This can be achieved using an extremely well-characterized and stable electric heater for which temperature can be closely correlated to input power. Alternatively, the resonator's temperature could be locally monitored and the resonator heated according to the monitored temperature.

By way of example only, and not limitation, FIG. 6 depicts an embodiment of this invention which can effect such local monitoring and heating. Coupler 301 shown in FIG. 6 includes a resonator 5 having a heater 303 with a serpentine resistive element 31 which can be energized through contact pads 117, 217, and which is comparable to that shown in FIG. 5. Superimposed on this structure is a bimetallic thermocouple 41, which consists of two dissimilar metal films 35, 37. These films 35, 37 are shaped with relatively narrow tongues 43, 43' and relatively wide contacts 45, 45'. The tongues 43, 43' form an overlapping junction 33 over the resonator 5. A suitable insulator dielectric (not shown), such as $SiO_2$, is applied between the thermocouple 41 and serpentine resistive element 31 to prevent electrical short circuits between these components. Thermocouple 41 could be formed in a known manner from a wide variety of dissimilar materials, such as copper, chrome, iron, or Constantan (a known Cu/Ni alloy). In known fashion, a voltage closely corresponding to the temperature will be formed at the overlapping junction 33 of the thermocouple 41. This voltage can be detected by measuring the difference in potential between contact 45 and contact 45'. Since the voltage closely correlates to the temperature of the junction 33, the temperature of the junction 33 can be accurately determined and the serpentine resistive element 31 can be energized accordingly. By way of example only, once the temperature of resonator 5 is known, that temperature could be closely regulated using a feedback loop to control energization of the serpentine resistive element 31.

Other known temperature measurement methods, such as the use of thin-film platinum resistors (not shown), could be used to measure the temperature of the serpentine resistive element 31, and the serpentine resistive element 31 could be driven accordingly.

Figure 9A:
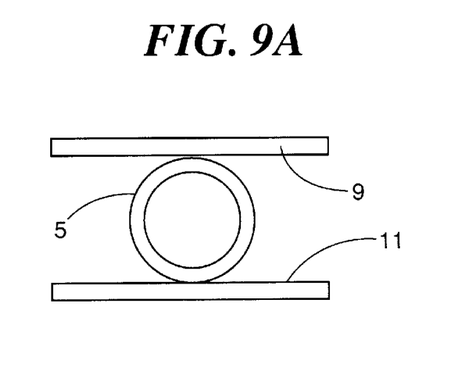
FIG. 9A depicts a circular resonator.
Figure 9B:
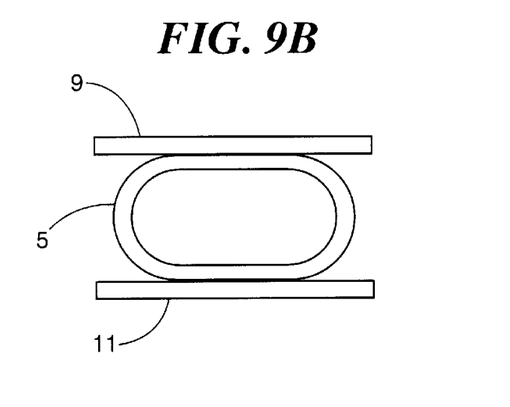
FIG. 9B depicts an elliptical resonator.
Figure 9C:
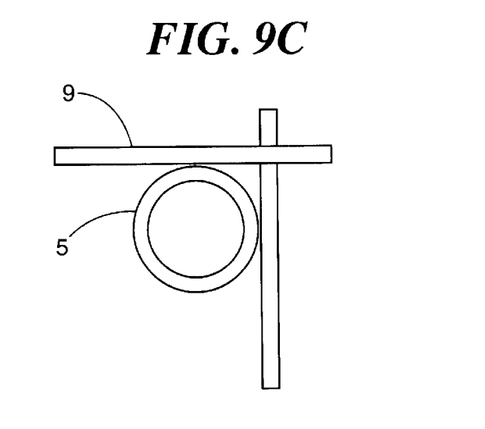
FIG. 9C depicts a resonator having perpendicular input and output waveguides.
Figure 9D:
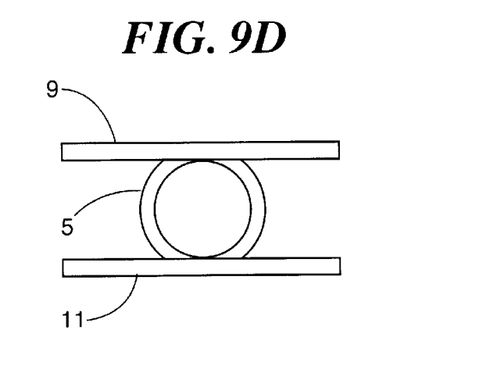
FIG. 9D depicts a zero-gap coupling resonator.
Figure 9E:
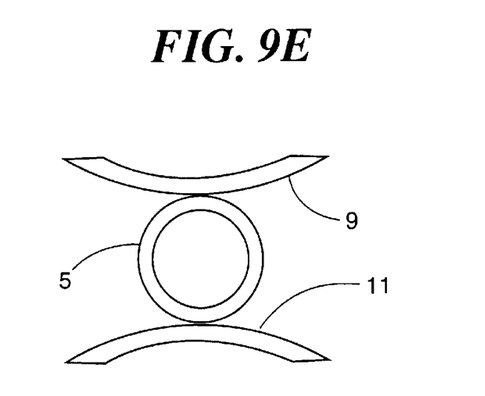
FIG. 9E shows a resonator having curved input and output waveguides.
Figure 9F:
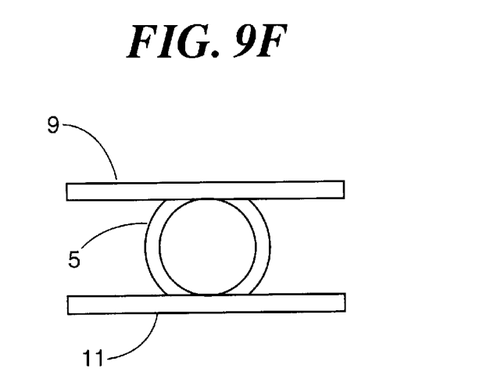
FIG. 9F depicts a vertical gap coupling resonator.

FIGS. 9A–F depict examples of different resonator and waveguide coupling configurations in which the present invention could be used, such as the elliptical resonator depicted in FIG. 9B, the resonator having perpendicular input and output guides of FIG. 9C, the zero-gap coupling resonator depicted in FIG. 9D, the resonator having both curved inputs and outputs of FIG. 9E, and the vertical gap coupling resonator of FIG. 9F. For the purposes of the present invention, these resonators are all considered as being equivalent to a ring resonator. The present invention could be used with all types of self-feeding resonators.

As described above, the diode heater 103 may be used with any semiconductor waveguide material, including by way of example only and not limitation, Si, GaAs and InP. The surface resistance heater 203, 303 may be used with waveguides of nearly any type of waveguide material, including by way of example only and not limitation, semiconductors, silica glass, polymers and lithium niobate.

The core layer 29 can be rectangular, with sides running from approximately 3–10 μm thick and approximately 3–15 μm wide. More preferably, the core layer 29 is square, with sides from approximately 6–8 μm thick and approximately 6–14 μm wide. The upper and lower cladding layers 25, 27 adjacent to core layer 29 can be approximately 3–18 μm thick, and are preferably approximately 15 μm thick. While a wide variety of materials can be used to make the core and cladding layers, silica is presently preferred.

The present thermal tuning invention is applicable to both strongly confined and weakly confined optical waveguides. The use of weakly-confined waveguides is presently preferred.

Figure 7:
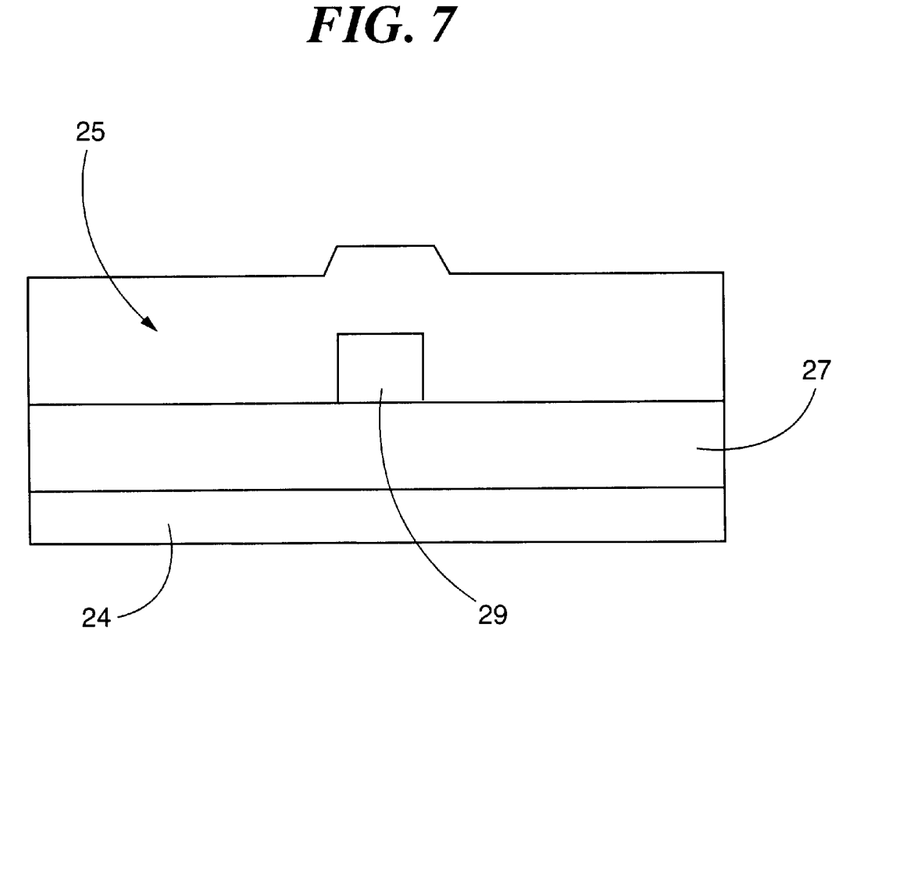
FIG. 7 is a cross-sectional view as taken along line 7—7 of FIG. 4A.
Figure 8:
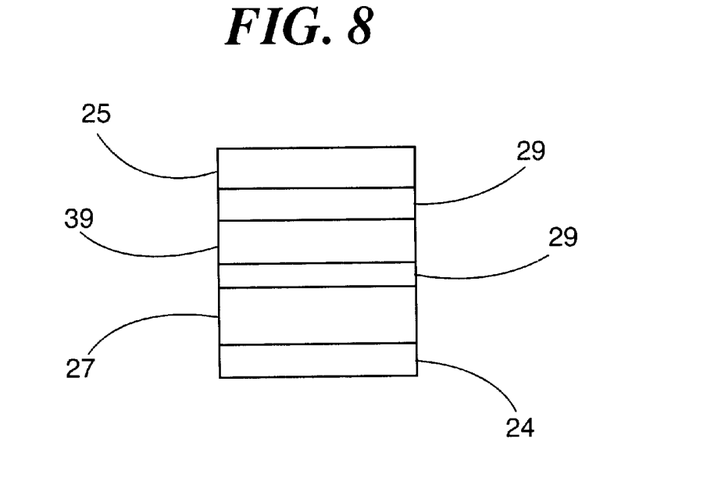
FIG. 8 is a cross-sectional view of a portion of a resonator suitable for use as a laser in an active architecture device.

The present invention has been described in the context of a passive resonator network such as that depicted in FIG. 1 in the role of a filter. A cross-section of a passive waveguide structure is depicted in FIG. 7, and includes a core layer 29, sandwiched between an upper cladding layer 25 and a lower cladding layer 27. The entire assembly can rest upon a substrate 24. This invention is not to be limited thereto, and can for example also be used in an active architecture as a laser. In such a configuration, shown in FIG. 8, the resonator 5 includes an active layer 39 of material which provides gain. The active layer 39 can be made from a wide variety of materials. Active layer 39 is sandwiched core layers 29, which core layers 29 are in turn sandwiched between an upper cladding layer 25 and a lower cladding layer 27. The entire assembly can rest upon a substrate 24.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween. While preferred arrangements of this tunable ring resonator are as shown above, it will be appreciated that other configurations also could be employed while remaining within the scope of this invention.

What is claimed is:

1. A thermally tunable resonator comprising:
   a resonator body having a resonance wavelength which changes as a function of temperature;
   a trench formed inside the resonator body;
   a disk formed inside the trench, the disk comprising a plurality of semiconductor layers, the layers being suitably doped to form a forward biased junction;
   a first electrode disposed atop the disk and in electrical contact with the forward biased junction, the electrode being dimensioned so as not to cover the resonator body; and
   a second eletrode disposed beneath and in electrical contact with the forward biased junction;
   wherein when a current is applied through the first and the second electrodes to the forward biased junction, heat is generated, changing the resonance wavelength of the resonator body.

2. A thermally tunable resonator according to claim 1, further comprising:

a layer of a leveling material covering the resonator body and the trench;

wherein the leveling material does not cover at least a portion of the disk through which the first electrode is in electrical contact with the forward biased junction.

3. A thermally tunable resonator according to claim 2, wherein the leveling material comprises at least one of BCB, plyimide, $SiO_2$ and $Si_3N_4$.

4. A thermally tunable resonator according to claim 2, further comprising an electrical contact electrically connected to the first electrode, the electrical contact being disposed atop the leveling material.

5. A thermally tunable resonator according to claim 1, wherein the resonator body, the trench and the disk are concentrically arranged about a common center.

6. A thermally tunable resonator according to claim 5, wherein the resonator body is ring-shaped, the trench is ring-shaped, and the disk is cylindrical.

7. A thermally tunable resonator according to claim 5, wherein the first electrode is circular and is also concentrically arranged about the common center.

8. A thermally tunable resonator according to claim 1, wherein both the disk and the trench are shaped in correspondence with a shape of the resonator body.

9. A thermally tunable resonator comprising:
a resonator body having a resonance wavelength which changes as a function of temperature; and
a heater, comprising:
a first contact pad,
a second contact pad, and
a resistive element in electrical contact with both the first and the second contact pads, the resistive element being disposed above the resonator body; and
the resistive element overlapping the resonator body with a substantial uniformity;
wherein when a current is applied through the first and the second contact pads to the resistive element, heat is generated, changing the resonance wavelength of the resonator body.

10. A thermally tunable resonator comprising:
a resonator body having a resonance wavelength which changes as a function of temperature; and
a heater, comprising:
a first contact pad,
a second contact pad, and
a resistive element having a serpentine shape, in electrical contact with both the first and the second contact pads, the resistive element being disposed above the resonator body;
wherein when a current is applied through the first and the second contact pads to the resistive element, heat is generated, changing the resonance wavelength of the resonator body.

11. A thermally tunable resonator comprising:
a resonator body having a resonance wavelength which changes as a function of temperature;
a heater comprising:
a first contact pad;
a second contact pad; and
a resistive element in electrical contact with both the first and the second contact pads, the resistive element being disposed above the resonator body; and
a temperature sensor which senses a temperature of the resonator body;
wherein when a current is applied through the first and the second contact pads to the resistive element, heat is generated, changing the resonance wavelength of the resonator body.

12. A thermally tunable resonator according to claim 11, wherein the temperature sensor comprises a thermocouple.

13. A thermally tunable resonator according to claim 12, wherein the thermocouple is disposed above the resistive element.

14. A thermally tunable resonator according to claim 13, further comprising a control circuit which controls the current applied to the resistive element according to the temperature of the resonator body detected by the temperature sensor.

15. A thermally tunable resonator according to claim 14, wherein the resistive element overlaps the resonator body.

16. A thermally tunable resonator according to claim 15, wherein the resistive element overlaps the resonator body with substantial uniformity.

17. A thermally tunable resonator according to claim 11, wherein the resistive element has a serpentine shape.

* * * * *